(12) United States Patent  
De Bondt et al.

(10) Patent No.: US 8,707,527 B2
(45) Date of Patent: Apr. 29, 2014

(54) METHOD TO PROVIDE COIL SHAVED METAL FIBERS

(75) Inventors: Stefaan De Bondt, Heestert (BE); Inge Schildermans, Marke (BE)

(73) Assignee: NV Bekaert SA, Zwevegen (BE)

( * ) Notice: Subject to any disclaimer, the term of this patent is extended or adjusted under 35 U.S.C. 154(b) by 1223 days.

(21) Appl. No.: 12/597,386

(22) PCT Filed: Apr. 25, 2008

(86) PCT No.: PCT/BE2008/000031
§ 371 (c)(1),
(2), (4) Date: Oct. 23, 2009

(87) PCT Pub. No.: WO2008/131500
PCT Pub. Date: Nov. 6, 2008

(65) Prior Publication Data
US 2010/0129682 A1    May 27, 2010

(30) Foreign Application Priority Data
Apr. 25, 2007   (EP) ...................................... 07008376

(51) Int. Cl.
*B23P 17/06* (2006.01)
(52) U.S. Cl.
USPC ............... 29/4.53; 29/4.51; 29/4.52; 82/1.11; 428/605
(58) Field of Classification Search
USPC ........... 29/4.51, 4.52, 4.53; 82/1.11; 428/605, 428/684
See application file for complete search history.

(56) References Cited

U.S. PATENT DOCUMENTS

| | | | | |
|---|---|---|---|---|
| 3,469,297 A | * | 9/1969 | Webber | ......................... 428/605 |
| 4,640,156 A | * | 2/1987 | Nakagawa et al. | ............ 82/1.11 |
| 4,930,199 A | | 6/1990 | Yanagisawa | |

FOREIGN PATENT DOCUMENTS

| | | |
|---|---|---|
| EP | 0764488 B1 | 3/1997 |
| GB | 1051275 | 12/1966 |
| JP | 01316137 A | 12/1989 |
| JP | 03161221 A | 7/1991 |
| JP | 04082627 A | 3/1992 |
| WO | 2005028135 A1 | 3/2005 |

OTHER PUBLICATIONS

Official Action of JPO in JP2010-504391, Jul. 31, 2012 with English language translation.

(Continued)

*Primary Examiner* — Richard Chang
(74) *Attorney, Agent, or Firm* — Bacon & Thomas, PLLC

(57) ABSTRACT

A method for providing coil shaved metal fibers according to the present invention comprises the steps of -providing a metal composite foil, the metal composite foil comprising oat least two metal layers (Lx) for being converted into metal fibers, each pair of adjacent metal layers are mutually separated by a sacrificial layer (Sy) provided from a sacrificial metal, each sacrificial layer (Sy) having a first and second surface, whereby for each sacrificial layer, the first surface contacts one of the pair of adjacent metal layers, the second surface is contacting the other of the pair of adjacent metal layers; -coiling said metal composite foil on a shaft thereby providing a metal coil having one free end surface; -rotating the metal coil and cutting the free end surface of the metal coil by means of a cutting tool, thereby providing a bundle of composite fibers; -removing the sacrificial metal of the sacrificial layers from the composite fibers thereby providing a bundle of metal fibers, each metal fiber being obtained from one of the metal layers (Lx).

15 Claims, 3 Drawing Sheets

(56) References Cited

OTHER PUBLICATIONS

Examination Report of Chinese Intellectual Property Office regarding Chinese Patent Application No. 200880013546.3, Dec. 17, 2010.
International Preliminary Report on Patentability in PCT/BE2008/000031, Nov. 5, 2009.
International Search Report in PCT/BE2008/000031, Aug. 27, 2008.
Examination Report of China IP Office regarding CN 2008/80013546.3, Mar. 5, 2012.
Communication from the European Patent Office regarding European Patent Application No. 08 748 047.1, Feb. 23, 2010.

* cited by examiner

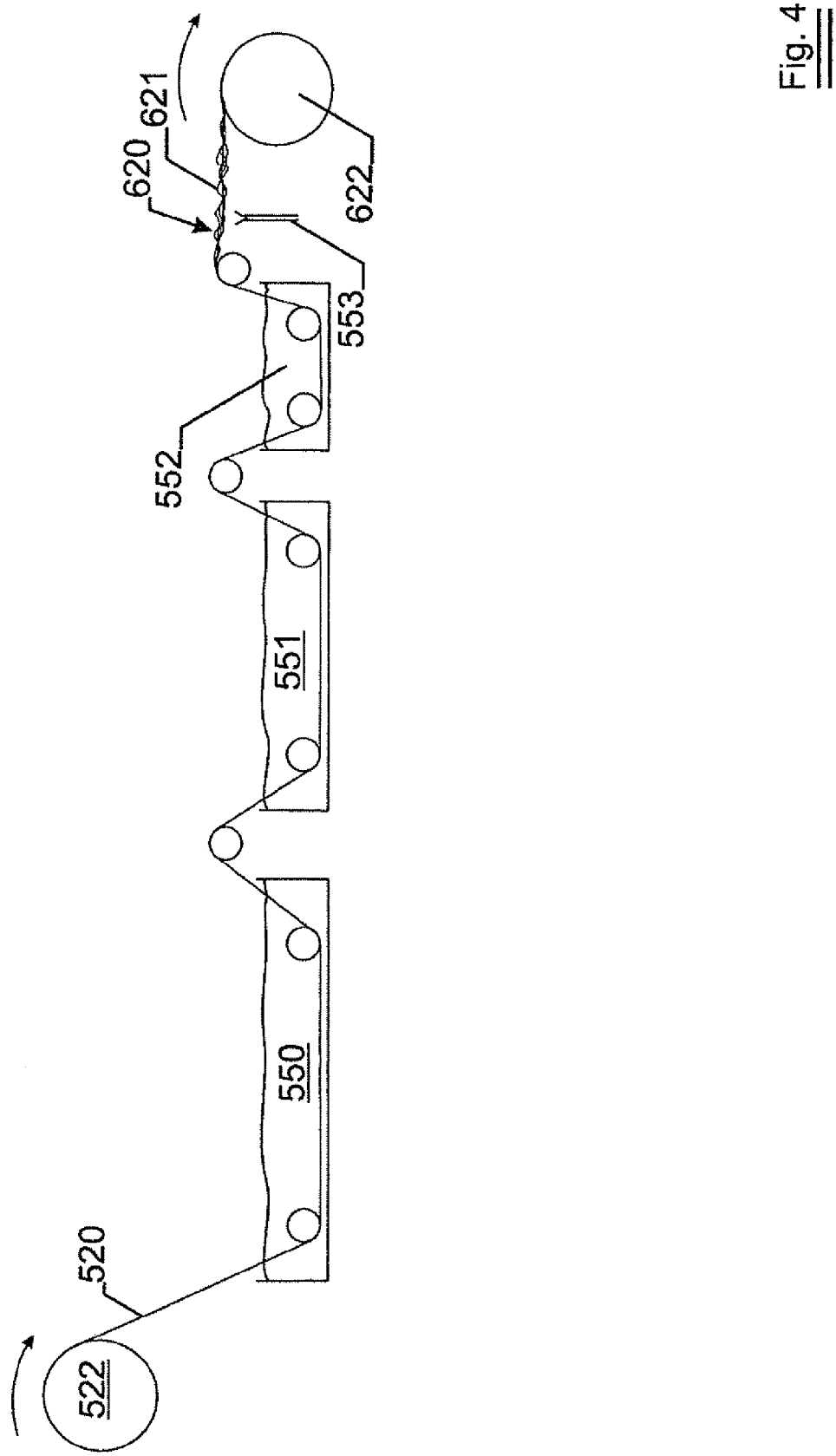

METHOD TO PROVIDE COIL SHAVED METAL FIBERS

TECHNICAL FIELD OF THE INVENTION

The present invention relates to metal fibers, more particular to coil shaved metal fibers and to a method to provide coil shaved metal fibers.

BACKGROUND OF THE INVENTION

Coil shaved metal fibers are known in the art from U.S. Pat. No. 4,930,199. Coil shaved fibers comprising several layers of different metals or metal alloys are known from WO2005/028135A1. Coil shaved metal fibers typically have a substantially rectangular cross section, due to the process of coil shaving. This is different from e.g. bundle drawn metal fibers, which have usually a pentagonal or hexagonal cross section. The coil shaved metal fibers also differ from other machined metal fibers such as steel wool. Steel wool usually has a rather triangular cross section.

The presently known coil shaved fibers have several disadvantages, which disadvantages are linked to process limitations of the presently known processes for shaving metal fibers from a coiled metal foil.

The presently known coil shaved metal fibers may only be provided at relatively high equivalent diameters. This is because the equivalent diameter is dependent on the thickness of the foil used on the one hand, and the cutting rate, i.e. the advancement of the cutting tool per rotation of the coil provided on the rotating spindle in axial direction of the spindle, on the other hand. Although some metal foils of 10 µm thickness are known, the provision of machineable foils with thicknesses of less than 35 µm is difficult if not impossible for a considerable number of metal alloys. On the other hand, it seems to be difficult if not impossible to shave at a cutting rate of less than about 10 µm. At present, the foil thickness is chosen larger than the cutting rate. When the foil is too thin, or the cutting rate is too small, the shaving operation is subjected to numerous process interruptions, i.e. broken bundles of metal fibers.

It is believed that these ruptures of coil shaved fibers are due to upsetting of the fiber surface due to the shaving operation itself.

It is found that coil shaved metal fibers are rather uneven, especially along the sides which have been in contact with the cutting tool during shaving. These are the sides which have a length substantially equal to the thickness of the foil used. It is believed that the upset causing such a rough surface creates weak spots at the mantle surface of the fibers along the fiber length. As the foil thickness is usually chosen larger than the cutting rate, the rough surface is present along at least more than 50% of the fiber surface.

In spite of their relatively large equivalent diameter, coil shaved metal fibers as presently known are rather fragile, which is also believed to be due to the upset at the fiber surface and the creation of numerous weak spots. The force at rupture in function of the fineness of the fiber (tex) (also known as specific stress and expressed in N/tex) or in function of the surface area of a fiber radial cross sections, thus in function of equivalent diameter, (also known as stress and expressed in N/µm$^2$) is very low as compared to usual comparable values of metal wires made from the same metal material.

Presently known coil shaved fibers also show a relatively large deviation of the equivalent diameter of the metal fibers in a bundle of coil shaved metal fibers. This large deviation renders the bundles of coil shaved metal fibers not useful for particular applications, and necessitates the use of more expensive bundle drawn metal fibers with this equivalent diameter.

SUMMARY OF THE INVENTION

It is an object of the present invention to provide improved coil shaved metal fibers and methods of making the same. An advantage of the present invention is to provide coil shaved metal fibers having a smaller equivalent diameter as compared to presently known coil shaved metal fibers. It is an advantage of some embodiments of the present invention that the coil shaved metal fibers have a resistance to rupture in function of their equivalent diameter, which is improved as compared to the resistance to rupture in function of the equivalent diameter of presently known coil shaved metal fibers. Coil shaved metal fibers according to the present invention are less fragile. It is an advantage of some embodiments of the present invention that the coil shaved metal fibers have less rough fiber surfaces, also known as mantle surface of the fiber.

It is also an object of the present invention to provide an improved method of production of coil shaved metal fibers. An advantage of the present invention is that it allows the provision of coil shaved metal fibers with smaller equivalent diameter, and in particular the provision of metal fibers with smaller equivalent diameter in a more efficient and more economical way. Metal fibers with smaller equivalent diameter may be used to provide more efficient filter media provided from such metal fibers, such as filter media comprising metal fibers with finer, i.e. smaller equivalent diameter having a higher filter rate and a higher filter efficiency. The method allows production of coil shaved metal fibers with increased resistance to rupture in function of their equivalent diameter and/or with less rough fiber mantle surfaces.

The metal fibers according to the present invention show a smaller equivalent diameter standard deviation as compared with presently known coil shaved metal fibers.

The method allows the provision of metal fibers from metal alloys which are normally considered difficult to machine, e.g. austenitic steel metal alloys. Some embodiments of the method according to the present invention allow the provision of particular intermetallic fibers, e.g. FexAly-alloy fibers, which are of particular use in gas filtration applications of metal fiber fleeces, e.g. sintered metal fiber fleeces.

The above objective is accomplished by a method for providing coil shaved metal fibers and coil shaved metal fibers according to the present invention.

According to a first aspect of the present invention, a method for providing coil shaved metal fibers is provided, comprising the steps of providing a metal composite foil, the metal composite foil comprising at least two metal layers (Lx) for being converted into metal fibers, each pair of adjacent metal layers being mutually separated by a sacrificial layer (Sy) provided from a sacrificial metal, each sacrificial layer (Sy) having a first and second surface, whereby for each sacrificial layer, the first surface contacts one of the pair of adjacent metal layers, and the second surface is contacting the other of the pair of adjacent metal layers;

coiling said metal composite foil on a shaft thereby providing a metal coil having one free end surface;

rotating the metal coil and cutting the free end surface of the metal coil by means of a cutting tool thereby providing a bundle of composite fibers;

removing the sacrificial metal of the sacrificial layers from the composite fibers thereby providing a bundle of metal fibers, each metal fiber being obtained from one of the Metal layers (Lx).

Preferably, the sacrificial metal adheres to the metal layers and will remain in its position relative to the metal layers. A metal composite foil is thus obtained which behaves like a unitary whole.

This method has the advantage that fine coil shaved metal fibers can be provided efficiently. The coil shaved fibers can be made having an equivalent diameter in a range between 0.01 μm and 26 μm. Production yield and cost can be kept lower than for comparable diameters of bundle drawn metal fibers.

It further allows providing metal fibers in metal alloys which are less easy or even impossible to machine, e.g. alloys of AISI 300-series, e.g. AISI 316L. Metal plates and foils out of these alloys are more difficult to cut because of their inherent toughness. By combining several, thicker layers of metal, mutually separated with a sacrificing metal layer to provide a composite foil, this composite foil may further be reduced in thickness, hence reducing each layer of the composite foil at substantially the same rate. Furthermore the presence of the sacrificial layer facilitates the cutting so that fibers with relatively small equivalent diameter may be obtained, even out of less easy machineable metal alloys.

The method also has the advantage to provide coil shaved metal fibers with at least one, usually two sides having a reduced roughness (smoother) as compared to presently known coil shaved fibers. The coil shaved metal fibers have a substantially rectangular shape and the sides of the rectangle which were in contact with the sacrificial metal layer during shaving, provide the less rough sides of the coil shaved metal fibers. The less rough sides of the mantle surface may be the large sides of the rectangular cross section. Hence a significant part of the fibers mantle surface is provided with a less rough surface. Without being limited by theory, it is believed that the provision of a less rough surface is the cause of increased force at rupture in function of the fineness of the fiber (tex) or increased force at rupture in function of the surface area of a fiber radial cross sections (thus in function of equivalent diameter) (also known as stress and expressed in $N/\mu m^2$) as compared to usual comparable values of metal wires made from the same metal material. Force at rupture in function of the surface area of a fiber radial cross sections in the range of 700 MPa to 3000 MPa, such as 800 MPa, 1200 MPa, 1800

MPa or 2400 MPa (wherein Mpa equals $N/mm^2$) for coil shaved fibers as subject of the present invention can be measured It has also been found that the deviation of the measured equivalent diameters of different metal fibers from one and the same bundle of metal fibers obtained by the method according to the first aspect of the present invention, is substantially less than the deviation measured on comparable coil shaved metal fibers obtained by a method according to prior art.

According to embodiments, the number of metal layers may range from 2 to 2500, although also more metal layers may be used.

According to some embodiments of the present invention, the thickness of each of the metal layers (Lx) as used for coiling said metal composite foil on a shaft may be in the range of 0.01 μm to 10 μm, for example 0.05 μm, 0.1 μm, 0.5 μm, 1 μm, 2 μm, or 5 μm.

According to some embodiments of the present invention, the metal composite foil may comprise at least two metal layers (Lx), one of the at least two metal layers having a first thickness and another of the at least two metal layers having a second thickness, the first and second thickness being different from each other.

This embodiment allows making bundles of coil shaved metal fibers which bundle comprises metal fibers having different equivalent diameters in one and the same bundle. However, for each of the group of fibers having a particular equivalent diameter, the deviation on this particular equivalent diameter is small, at least smaller as for comparable coil shaved metal fibers as known in prior art.

According to some embodiments of the present invention, the metal composite foil comprises at least two sacrificial layers (Sy), one of the at least two sacrificial layers having a first thickness and another of the at least two sacrificial layers having a second thickness, whereby the first sacrificial layer thickness may be different from the second sacrificial layer thickness.

According to some embodiments of the present invention, the steps of providing a metal composite foil may comprise at least one thickness reduction step for reducing the thickness of the metal composite foil prior to the step of coiling said metal composite foil onto a shaft. According to some embodiments of the present invention, the thickness of each of the metal layers (Lx) prior to the at least one thickness reduction step may be in the range of 20 μm to 5000 μm, such as 50 μm, 200 μm or 500 μm. According to some embodiments of the present invention, the thickness of each of the sacrificial layers (Sy) prior to the at least one thickness reduction step may be in the range of 1 μm to 1000 μm, such as in the range of 1 μm to 10 μm.

According to some embodiments of the present invention, the steps of providing a metal composite foil may comprise at least one heat treatment step for subjecting the metal composite foil to a heat treatment prior to the step of coiling said metal composite foil onto a shaft.

According to some embodiments of the present invention, the steps of providing a metal composite foil may comprise at least two thickness reduction steps. At least one heat treatment step for subjecting the metal composite foil to a heat treatment can be applied after one of the at least two thickness reduction steps and before another of the at least two thickness reduction steps.

According to an embodiment of the present invention, at least one of the at least two metal layers (Lx) is provided from a first foil or layer of a first metal or metal alloy and a second foil or layer of a second metal or metal alloy directly in contact with the first foil or layer of a first metal or metal alloy, which first and second metal or metal alloys are transformed into an intermetallic metal layer by heat treatment steps and the thickness reduction steps applied to the metal composite foil.

According to an embodiment of the present invention, the metal composite foil may comprise at least two metal layers (Lx), the metal alloy of one of the at least two metal layers being different from the metal alloy of another of the at least two metal layers.

The method also allows the provision of a bundle of intimately blended metal fibers from different alloys and/or from different equivalent diameters. This may be obtained by using metal layers (Lx) in the composite provided from a different metal alloy and/or having different thicknesses.

According to an embodiment of the present invention, each of the metal layers (Lx) may be provided from a metal selected from the group consisting of aluminium, nickel, titanium, iron, chromium or is provided from an alloy comprising at least one of these metals. Such alloys may be e.g.

brass, steel, stainless steels such as AISI 300 series steels or AISI 400 series steels, in particular AISI 302, AISI 304, AISI 316, AISI 430 or AISI 440; or an Fe—Ni—Cr alloy or a Fe—Cr—Al alloy, such as e.g. ALUCHROME®, FECRAL-LOY® or INCONEL®. Preferred Fe—Cr—Al alloys comprise more than 4% Al or comprise Hf and/or Zr and/or a rare earth metal such as La or Ce.

According to an embodiment of the present invention, the metal alloy of each of the sacrificial layers (Lx) may be Cu or a Cu-alloy.

According to an embodiment of the present invention, removing the sacrificial metal of the sacrificial layers from the composite fibers may be obtained by dissolving the sacrificial metal. Dissolving may e.g. be done using any suitable acid in which the sacrificial layer dissolves.

According to an embodiment of the present invention, the method further may comprise the step of providing a coating layer to at least one surface of the metal composite foil prior to coiling said metal composite foil onto a shaft.

According to a second aspect of the present invention, a coil shaved metal fiber is provided. The metal fiber has a substantially rectangular cross section, the metal fiber having a first and a second, mutually opposed side and a third and a second mutually opposed side, the first side and the second side having a height (Hm) ranging between 0.01 μm and 10 μm, the third and fourth side having a width (Wm) being at least 3 times Hm, the first and second sides having a higher roughness than the third and fourth sides. The third and fourth side may have a width (Wm) ranging between 5 μm and 50 μm. The first, second, third and fourth sides of the fiber define a mantle surface of the fiber, the first side and the second side with the height (Hm) ranging between 0.01 μm and 10 μm also have a first roughness (R1), the third and fourth side with the height (Wm) being at least 3 times Hm have a second roughness (R2), the first roughness (R1) being greater than the second roughness (R2), wherein at most 25% of the mantle surface has the first roughness (R1).

According to some embodiments of the present invention, the fiber width (Wm) may be larger, even substantially larger, than the fiber height (Hm). The height of the first and second sides of the metal fiber are measured as the length of the first and second mutually opposed sides of the rectangular cross section, corresponding to these sides of the metal fiber. Similarly the widths of the third and fourth side of the metal fiber are measured as the length of the third and fourth side of the cross section, corresponding to these sides of the metal fiber.

These metal fibers according to embodiments of the present invention have the advantage that they can be manipulated more easily, e.g. with the creation of less dust and/or waste fibers (i.e. fibers with too short length for further manipulation or treatment in following processes) due to rupture of the shaved fibers under the mechanical load, e.g. as imposed in further processes.

According to some embodiments of the present invention the coil shaved metal fiber may have an equivalent diameter of less than 26 μm such as in the range of 0.01 μm to 26 μm. The equivalent diameter may be less than 10 μm, even less than 5 μm.

The fibers have the advantage that such finer metal fibers can be made in a more efficient, less expensive way.

According to some embodiments of the present invention, the coil shaved metal fiber may have a force at rupture in the range of 700 MPa to 3000 MPa, such as 800 MPa, 1200 MPa, 1800 MPa or 2400 MPa (wherein Mpa equals $N/mm^2$).

These metal fibers have the advantage that they can be manipulated more easily with creation of less dust and/or waste fibers (i.e. fibers with too short length for further manipulation or treatment in following processes), e.g.

due to rupture of the shaved fibers under the mechanical load as imposed in further processes.

According to an embodiment of the present invention, the coil shaved metal fiber may be provided from a metal selected from the group consisting of aluminium, nickel, titanium, iron, chromium or is provided from an alloy comprising at least one of these metals. Such alloys may be e.g. brass, steel, stainless steels such as AISI 300 series steels or AISI 400 series steels, in particular AISI 302, AISI 304, AISI 316, AISI 430 or AISI 440; or an Fe—Ni—Cr alloy or a Fe—Cr—Al alloy, such as e.g. ALUCHROMEO®, FECRALLOY® or INCONELO®. Preferred Fe—Cr—Al alloys comprise more than 4% AL or comprise Hf and/or Zr and/or a rare earth metal such as La or Ce According to a further aspect of the present invention, a fiber web is provided comprising coil shaved metal fibers according to the second aspect of the present invention. The web may be a non woven or woven fiber web. The fiber web may further comprise fibers other than the coil shaved metal fibers according to the second aspect of the present invention, and/or metal powder.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1, FIG. 2, FIG. 3 and FIG. 4 represent schematic representations of steps of a method to provide a coil shaved metal fiber according to an embodiment of the present invention.

Figure 1:
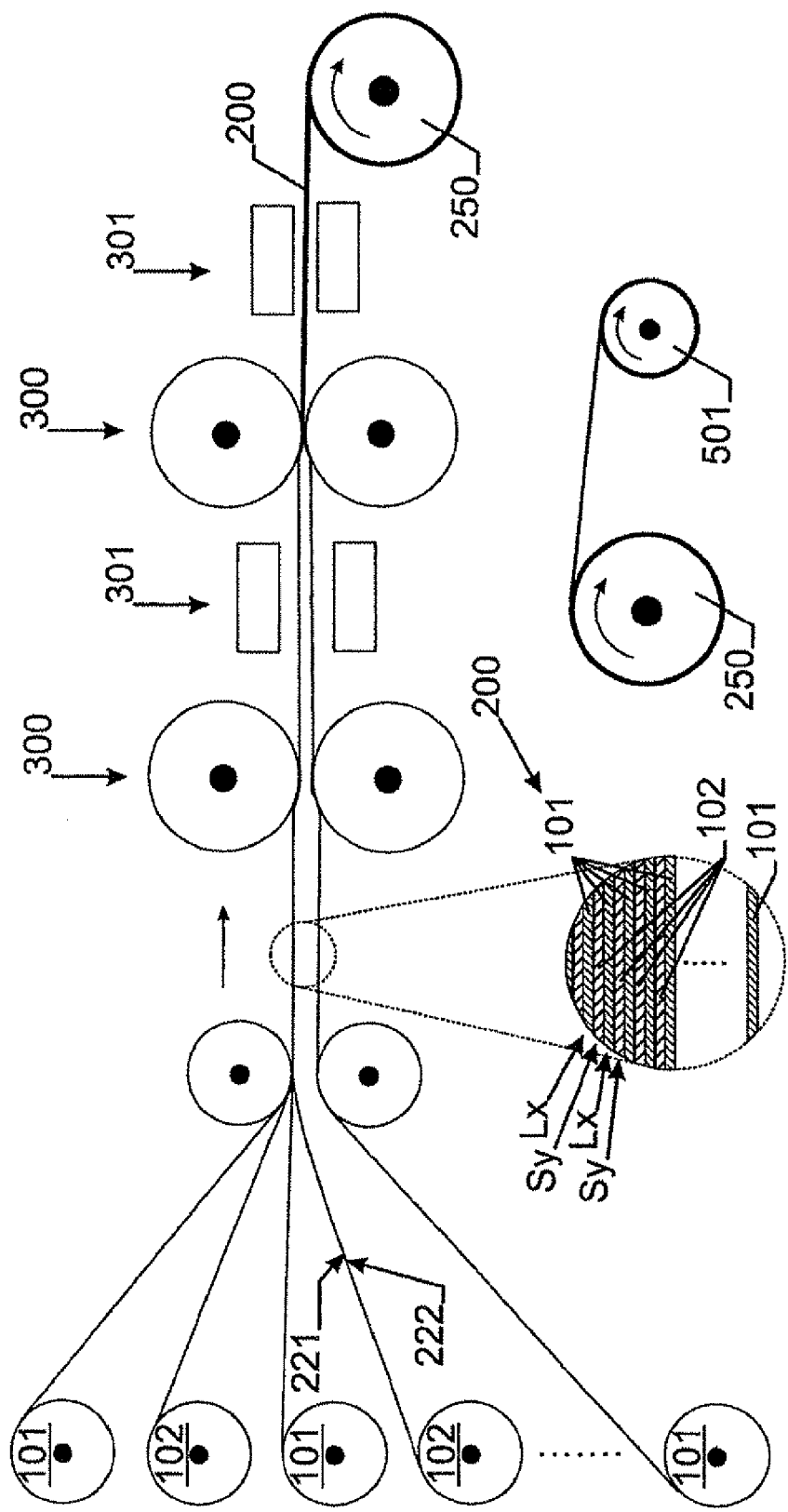

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

The term "equivalent diameter" of a fiber is to be understood as the diameter of an imaginary fiber having a circular radial cross section, which circular radial cross section has the same surface area as a radial cross section of the pertinent fiber in question. The equivalent diameter is obtained by, calculating the average from a statistically sufficient number of sample measurements.

The term "cutting rate" is the distance over which the cutting tool is displaced in a direction parallel to the axis of rotation of the coil towards the coil side, during one rotation of the coil.

Layer thickness of a layer is the thickness of the layer oriented according to a plane, the thickness being measured between the two outer surfaces of the layer and measured in a direction perpendicular to the plane.

The term "sacrificial metal" is to be understood as metal that will be consumed or removed instead of another metal that is present, in particular the metal of the metal fibers.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

FIG. 1, FIG. 2, FIG. 3 and FIG. 4 together show a schematic representation of the steps of a method to provide a coil shaved metal fiber according to a first embodiment of the present invention.

As shown in FIG. 1, a composite metal foil with a desired composition and thickness is provided.

A number of metal foils 101, out of which metal fibers are to be made, are provided. A number of foils 102 of sacrificial metal, such as Cu, are provided as well. The foils are stacked in such a way that between each pair of adjacent metal foils 101, a sacrificial metal foil 102 is provided. The foils are stacked or layered in order to provide a metal composite foil 200, the metal composite foil comprising at least two metal layers Lx for being converted into metal fibers and being provided by the metal foils 101. Between each pair of adjacent metal layers, a sacrificial layer Sy is provided from a sacrificial metal, each sacrificial layer being provided by one of the sacrificial metal foils 102.

In an alternative method, each of the metal foils 101 is coated on one or both sides with a sacrificial metal, e.g. Cu or Cu alloys by means of a coating technique such as electrochemical application, electroless application, powder coating, hot dipping, plating, lamination, or sputtering. The coated metal foils are stacked or layered in order to provide a metal composite foil 200, the metal composite foil comprising at least two metal layers Lx for being converted into metal fibers and being provided by the metal foils 101. Between each pair of adjacent metal layers, a sacrificial layer Sy is provided from the coating provided on one or both sides of the metal foils 101.

In the metal composite foil 200, each sacrificial layer Sy has a first surface 221 and second surface 222, whereby for each sacrificial layer Sy, the first surface 221 contacts one of the pair of adjacent metal layers, the second surface 222 is contacting the other of the pair of adjacent metal layers.

The metal composite foils may be subjected to a thickness reduction step 300, whereby the thickness of the metal composite foil is reduced by a given rate. The thicknesses of each of the metal layers Lx and the sacrificial layers Sy can be reduced at substantially the same rate. This reduction step may be a cold rolling or hot rolling step. A number of reduction steps may be applied. Optionally one or more heat treatment steps 301 may be applied, e.g. annealing of the metal composite foil, between consecutive thickness reduction steps 300. After reduction, the thickness of each of the metal layers (Lx) as used for coiling said metal composite foil on a shaft may be in the range of 0.01 µm to 10 µm, for example 0.05 µm, 0.1 µm, 0.5 µm, 1 µm, 2 µm, or 5 µm.

The stacked metal layers and sacrificial layers become mechanically fixed, e.g. due to the thickness reduction steps and heat treatment steps, which make the metal composite foil behave as a whole.

As shown in FIG. 1, these steps can be done in one process operation, or in more than one process operation, which process ends with coiling the metal composite foil 200 having a desired thickness and a desired composition. The metal composite foil is than coiled on a shaft for allowing the end surface of the coiled foil to be cut. However, optionally, an intermediate coil 250 is provided, which intermediate coil 250 is later on coiled or recoiled on a shaft on which the end surface of the coiled foil 501 is to be cut.

In FIG. 1, it is shown that the two outer layers of the metal composite foil are metal layers for providing a coil shaved metal fiber. Alternatively one or both the outer layer of the metal composite foil may be sacrificial layers.

As an example, when Cu is used as sacrificial metal for the sacrificial layers, and stainless steel, e.g. austenitic steel such as AISI 316L, as the metal alloy of the metal layers, the composite foil can be heat treated.

Figure 2:
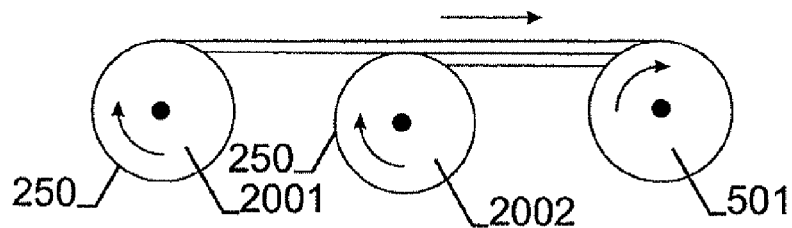

As shown in FIG. 2, optionally more than one, e.g. two, metal composite foils 2001 and 2002 provided as an intermediate coil 250, may be coiled simultaneously and one on top of the other or others. The metal composite foils coiled together, form a coil 501 of which the end surface of the coiled foil 501 is cut. Optionally the composite foils coiled together, form an intermediate coil, which is to be recoiled later for providing a coil 501 of which the end surface is cut.

Figure 3:
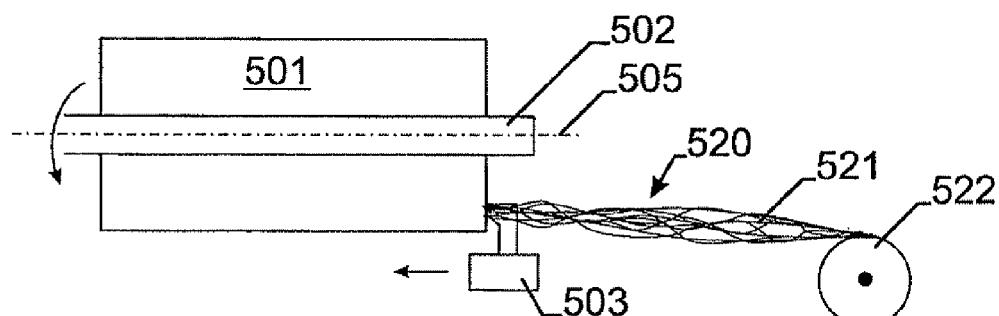

In the next step, as shown in FIG. 3, the coil 501 of metal composite layer, being coiled on a shaft 502, is cut by means of a cutting tool 503. The shaft is rotated about its axis 505 and in a rotation direction opposite to the rotation direction used to wind the metal composite foil 501 on the shaft, thereby providing the coil 501. The cutting tool 503, being e.g. a cutting head, a knife, a rotating cutting head, a rotating knife or a laser beam, is displaced in the direction towards the coil 501 and with a cutting rate of 5 µm to 50 µm per revolution of the shaft 502. In such a way, a bundle 520 of composite fibers 521 is provided and is wound on a cylinder 522.

Figure 6:
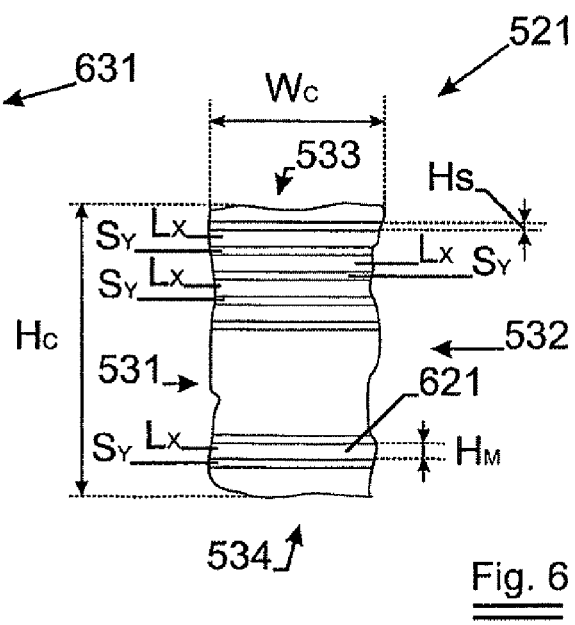
FIG. 6 is a schematic representation of a radial cross section of a composite fiber being an intermediate product of the method to provide a coil shaved metal fiber according to an embodiment of the present invention.

A schematic cross section of a composite fiber 521 is shown in FIG. 6. In the substantially rectangular cross section, the stacked structure of metal layers Lx and sacrificial layers Sy are visible. The height Hc of the composite fiber 521 is dependent and substantially identical to the thickness of the metal composite foil. The width Wc depends on the cutting rate of the cutting tool 503 during shaving. In the cross section, the height Hs of the sacrificial layers and the height of the metal layers Hm may be noticed. Along the long sides 531 and 532 of the rectangular cross section upsets due to the shaving process are noticeable.

In the next step, as shown in FIG. 4, the sacrificial metal of the sacrificial layers from the composite fibers is removed, thereby providing a bundle 620 of metal fibers 621, each metal fiber 621 being obtained from one of the metal layers Lx. As an example, one bundle 520 of composite fibers 521, or optionally more than one bundle of composite fibers, taken from the cylinder 522 are drawn through an acid bath 550 in which the sacrificial metal of the sacrificial layers Ly may dissolve, but in which the metal alloy of the metal layers Lx is not dissolved. As an example in case Cu is used as sacrificial metal, the bath 550 may be any suitable acid to dissolve the sacrificial material. Optionally, the Cu sacrificial material may be removed electrochemically. Following the removal of the sacrificial metal, e.g. by pickling in an acid bath, the bundle 620 of coil shaved metal fibers 621 is rinsed in rinsing baths 551 and 552. The bundles 620 may be dried by means of a drying air stream via appropriate air nozzles 553. The rinsed coil shaved metal fibers are wound on a cylinder 622.

Figure 5:
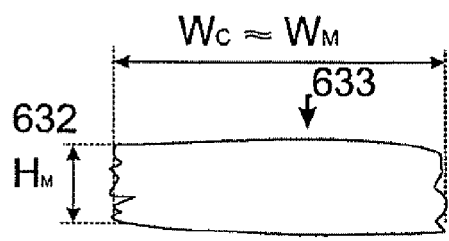
FIG. 5 is a schematic representation of a radial cross section of a coil shaved metal fiber according to an embodiment of the present invention.

As shown in FIG. 5, a coil shaved metal fiber 621 according to a second aspect of the present invention is shown. The coil shaved metal fiber 621 obtained according to this first aspect of the present invention, has a substantially rectangular cross section and has a height Hm, which may be in the range of 0.01 µm to 10 µm. The width Wm of the coil shaved metal fiber, which may range e.g. between 5 µm and 50 µm, is substantially identical to the width Wc of the composite fiber obtained by shaving the metal composite coil. A coil shaved metal fiber having an equivalent diameter in the range of 0.01 µm to 26 µm may be obtained. The first side 631 and second side 632 of the cross section of the coil shaved metal fiber 621 were a part of the sides 531 or 532 of the composite fiber and may show some upset due to the shaving action during production of the fiber. The third side 633 and fourth side 634 are sides of the metal layer, which contacted the sacrificial layers and are less rough compared with the first and second side 631 and 632.

A force at rupture in function of the surface area of a fiber radial cross sections (thus in function of equivalent diameter, which is also known as stress and expressed in $N/pm^2$) in the range of 700 MPa to 3000 MPa, such as 800 MPa, 1200 MPa, 1800 MPa or 2400 MPa (wherein Mpa equals $N/mm^2$)may be obtained.

As an example, a metal composite foil comprising 50 metal layers of 1 mm thickness, each metal layer being provided from a Fe—Cr—Al alloy, e.g. FECRALLOY®, with between each pair of adjacent metal layers, a sacrificial Cu-layer of a thickness of 0.1 mm is provided. The Cu-layers are provided as a Cu-foil.

The composite foil was reduced in thickness by rolling and annealing, and a composite foil of 55 µm thickness was provided. This foil, coiled on a shaft, was shaved by means of cutting of the end of the coiled metal composite foil, at a rate of 10 µm per revolution of the coil.

The bundle of composite fibers was subjected to a pickling step, whereby the Cu sacrificial material was removed from the composite fibers. For each bundle, metal fibers from Fe—Cr—Al alloy were obtained having a substantially rectangular cross section with a height of about 1 μm and width of about 10 μm, thus having an equivalent diameter of about 3.57 μm².

The roughness of the third and fourth side was significantly less than the roughness of the first and second side. The first, second, third and fourth sides of the fiber define a mantle surface of the fiber, the first side and the second side with the height (Hm) ranging between 0.01 μm and 10 μm also have a first roughness (R1), the third and fourth side with the height (Wm) being at least 3 times Hm have a second roughness (R2), the first roughness (R1) being greater than the second roughness (R2), wherein at most 25% of the mantle surface has the first roughness (R1). Such a fiber can have a rectangular cross-section.

A force at rupture in function of the surface area of a fiber radial cross sections (thus in function of equivalent diameter, also known as stress and expressed in $N/\mu m^2$) in the range of 700 MPa to 3000 MPa, such as 800 MPa, 1200 MPa, 1800 MPa or 2400 MPa (wherein Mpa equals $N/mm^2$)was obtained.

Other arrangements for accomplishing the objectives of the method embodying the invention will be obvious for those skilled in the art.

It is clear that the thickness of the metal layers and the thickness of the sacrificial layers may mutually be different. In case of different metal layer thicknesses, the metal fibers obtained will have a mutually different equivalent diameter. However for each fiber in a bundle of metal fibers obtained by coil shaving method according to the first aspect of the present invention, all cross sections will have two mutually parallel sides being substantially identical for all metal fibers in the same bundle.

It is also understood that metal layers provided from different metal alloys may be part of one and the same metal composite foil. The bundle of metal fibers obtained will comprise metal fibers from different metal alloys.

The coil shaved metal fibers according to a second embodiment of the present invention may be used to provide metal fiber fleeces, such as metal fibers sintered fleeces or structures for use as burner surface, e.g. radiant gas burner surfaces, or filter media for filtration of fluids such as liquids or gases. The metal fiber fleeces, such as metal fibers sintered fleeces or structures may be used for diesel exhaust filtration or purification or for acoustic damping purposes. As the deviation on fiber equivalent diameter is smaller, the deviation on air permeability of the fleece is reduced as compared to prior art.

It is to be understood that although preferred embodiments, specific constructions and configurations, as well as materials, have been discussed herein for devices according to the present invention, various changes or modifications in form and detail may be made without departing from the scope and spirit of this invention. Steps may be added or deleted to methods described within the scope of the present invention.

The invention claimed is:

1. A method for providing coil shaved metal fibers, comprising:
    providing a metal composite foil, the metal composite foil comprising at least two metal layers (Lx) for being converted into shaved metal fibers, said at least two metal layers being adjacent and defining a pair of adjacent metal layers, each pair of adjacent metal layers being mutually separated by a sacrificial layer (Sy) provided from a sacrificial metal, each sacrificial layer (Sy) having a first and second surface, whereby for each sacrificial layer, the first surface contacts one of the pair of adjacent metal layers, and the second surface is contacting the other of the pair of adjacent metal layers;
    coiling said metal composite foil on a shaft thereby providing a metal coil having one free end surface;
    rotating the metal coil and cutting the free end surface of the metal coil by using a cutting tool, thereby providing a bundle of composite fibers; and
    removing the sacrificial metal of the sacrificial layers from the composite fibers thereby providing a bundle of metal fibers, each metal fiber being obtained from one of the metal layers (Lx).

2. The method for providing coil shaved metal fibers according to claim 1, wherein the thickness of each of the metal layers (Lx) as used for coiling said metal composite foil on a shaft is in the range of 0.01 μm to 10 μm.

3. The method for providing coil shaved metal fibers according to claim 2, wherein the metal composite foil comprises at least two metal layers (Lx), one of the at least two metal layers having a first thickness and another of the at least two metal layers having a second thickness, the first and second thickness being different from each other.

4. The method for providing coil shaved metal fibers according to claim 1, wherein the metal composite foil comprises at least two sacrificial layers (Sy), one of the at least two sacrificial layers having a first thickness and another of the at least two sacrificial layers having a second thickness, the first sacrificial layer thickness being different from the second sacrificial layer thickness.

5. The method for providing coil shaved metal fibers according to claim 1, wherein the steps of providing a metal composite foil comprises at least one thickness reduction step for reducing the thickness of the metal composite foil prior to the step of coiling said metal composite foil on a shaft.

6. The method for providing coil shaved metal fibers according to claim 5, wherein the thickness of each of the metal layers (Lx) prior to the at least one thickness reduction step is in the range of 20 μm to 5000 μm.

7. The method for providing coil shaved metal fibers according to claim 5, wherein the thickness of each of the sacrificial layers (Sy) prior to the at least one thickness reduction step is in the range of 1 μm to 1000 μm.

8. The method for providing coil shaved metal fibers according to claim 5, wherein the steps of providing a metal composite foil comprises at least one heat treatment step for subjecting the metal composite foil to a heat treatment prior to the step of coiling said metal composite foil on a shaft.

9. The method for providing coil shaved metal fibers according to claim 8, wherein the steps of providing a metal composite foil comprises at least two thickness reduction steps, at least one heat treatment step for subjecting the metal composite foil to a heat treatment being applied after one of the at least two thickness reduction steps and before another of the at least two thickness reduction steps.

10. The method for providing coil shaved metal fibers according to claim 9, wherein at least one of the at least two metal layers (Lx) is provided by providing a first foil or layer of a first metal or metal alloy and a second foil or layer of a second metal or metal alloy directly in contact with the first foil or layer of a first metal or metal alloy, which first and second metal or metal alloys are transformed into an intermetallic metal layer by the heat treatment steps and the thickness reduction steps applied to the metal composite foil.

11. The method for providing coil shaved metal fibers according to claim 1, wherein the metal composite foil comprises at least two metal layers (Lx), the metal alloy of one of the at least two metal layers being different from the metal alloy of another of the at least two metal layers.

12. The method for providing coil shaved metal fibers according to claim 1, wherein each of the metal layers (Lx) is provided from a metal selected from the group consisting aluminium, nickel, titanium, iron and chromium or is provided from an alloy comprising at least one of these metals.

13. The method for providing coil shaved metal fibers according to claim 1, wherein the metal alloy of each of the sacrificial layers (Sy) is Cu or a Cu-alloy.

14. The method for providing coil shaved metal fibers according to claim 1, wherein removing the sacrificial metal of the sacrificial layers from the composite fibers is obtained by dissolving the sacrificial metal.

15. The method for providing coil shaved metal fibers according to claim 1, wherein the method further comprises the step of providing a coating layer to at least one surface of the metal composite foil prior to coiling said metal composite foil on a shaft.

* * * * *